(12) United States Patent
Cheng (10) Patent No.: US 6,268,954 B1
(45) Date of Patent: Jul. 31, 2001

(54) METHOD AND SYSTEM FOR CONTROLLING THE SLOPE OF AN OUTPUT RESPONSE

(75) Inventor: Yihao Cheng, Kanata (CA)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/377,692

(22) Filed: Aug. 20, 1999

(51) Int. Cl.$^7$ ................................. H01S 3/00; G02B 5/20

(52) U.S. Cl. ................................. 359/337; 359/341; 372/2

(58) Field of Search .................................... 359/337, 338, 359/341, 349, 394, 488, 495, 498, 501, 589

(56) References Cited

U.S. PATENT DOCUMENTS

| | | | |
|---|---|---|---|
| 3,936,147 | * | 2/1976 | Murakami .............................. 350/158 |
| 4,678,287 | * | 7/1987 | Buhrer .................................. 350/404 |
| 5,033,828 | * | 7/1991 | Haruta .................................. 350/378 |
| 5,231,529 | * | 7/1993 | Kaede .................................... 359/124 |
| 5,436,760 | * | 7/1995 | Nakabayashi ......................... 359/341 |
| 5,724,184 | * | 3/1998 | Hesline ................................. 359/494 |
| 5,973,821 | * | 10/1999 | Onaka et al. ........................ 359/283 |
| 6,151,158 | * | 11/2000 | Takeda et al. ....................... 359/341 |

OTHER PUBLICATIONS

Ghera, U, Konforti, N, Moshe, T, "Wavelength Tunability in a Nd–Doped Fiber Laser with Intracavity Polarizer," IEEE Photonics Technology Letters, vol. 4, No. 1, pp. 4–6.*

* cited by examiner

Primary Examiner—Thomas H. Tarcza
Assistant Examiner—Deandra M. Hughes
(74) Attorney, Agent, or Firm—Neil Teitelbaum (57) ABSTRACT

This invention relates to a method for filtering and to a variable slope optical filter for in-line use with an optical amplifier signal. The filter has a wavelength response that is substantially linear in slope within a band of operation wavelengths of the amplifier; the slope of the filter in an operating band of wavelengths is between zero and only one of a positive or negative number; furthermore the filter has an amplitude response that has an opposite and counter slope as a function of wavelength to that of a gain tilt of the amplifier within the operation band of wavelengths. The filter having means of operating on polarized light such that different wavelengths within a band of wavelengths within the operation band are subject to different levels of attenuation according to their polarization state. A wave plate having a predetermined thickness provides a relative polarization difference between two wavelengths of an incoming beam in a controlled manner. A polarizer receives light from the wave plate and only allows a predetermined polarization of light to pass therethrough unattenuated and variably attenuates or substantially prevents and/or attenuates other predetermined polarizations of light to pass therethrough.

24 Claims, 5 Drawing Sheets

METHOD AND SYSTEM FOR CONTROLLING THE SLOPE OF AN OUTPUT RESPONSE

This invention relates generally to controlling the slope of an amplitude versus wavelength output response, and in one aspect relates more particularly to a variable gain tilt control system for use with an optional amplifier such as a rare earth doped optical fiber amplifier where a gain tilt exist over a wavelength band.

BACKGROUND OF THE INVENTION

Optical amplifiers and particularly erbium doped optical fiber amplifiers are nearly ubiquitous in optical transmission systems, particularly in the field of telecommunications. Erbium doped fiber amplifiers (EDFAs) have high polarization insensitive gain, low cross talk between signals of different wavelengths, good saturation output power, and a noise figure close to the fundamental quantum limit. The excellent noise characteristics allow hundreds of these amplifiers to be cascaded to cover spans of thousands of kilometers of optical fibre. EDFAs as opposed to electronic repeaters are also transparent to data rate, signal format, and wavelength over a limited range, making them useful for wavelength multiplexed (WDM) communication systems that simultaneously transmit a large number of signals using different wavelength bands for each signal.

Figure 1:
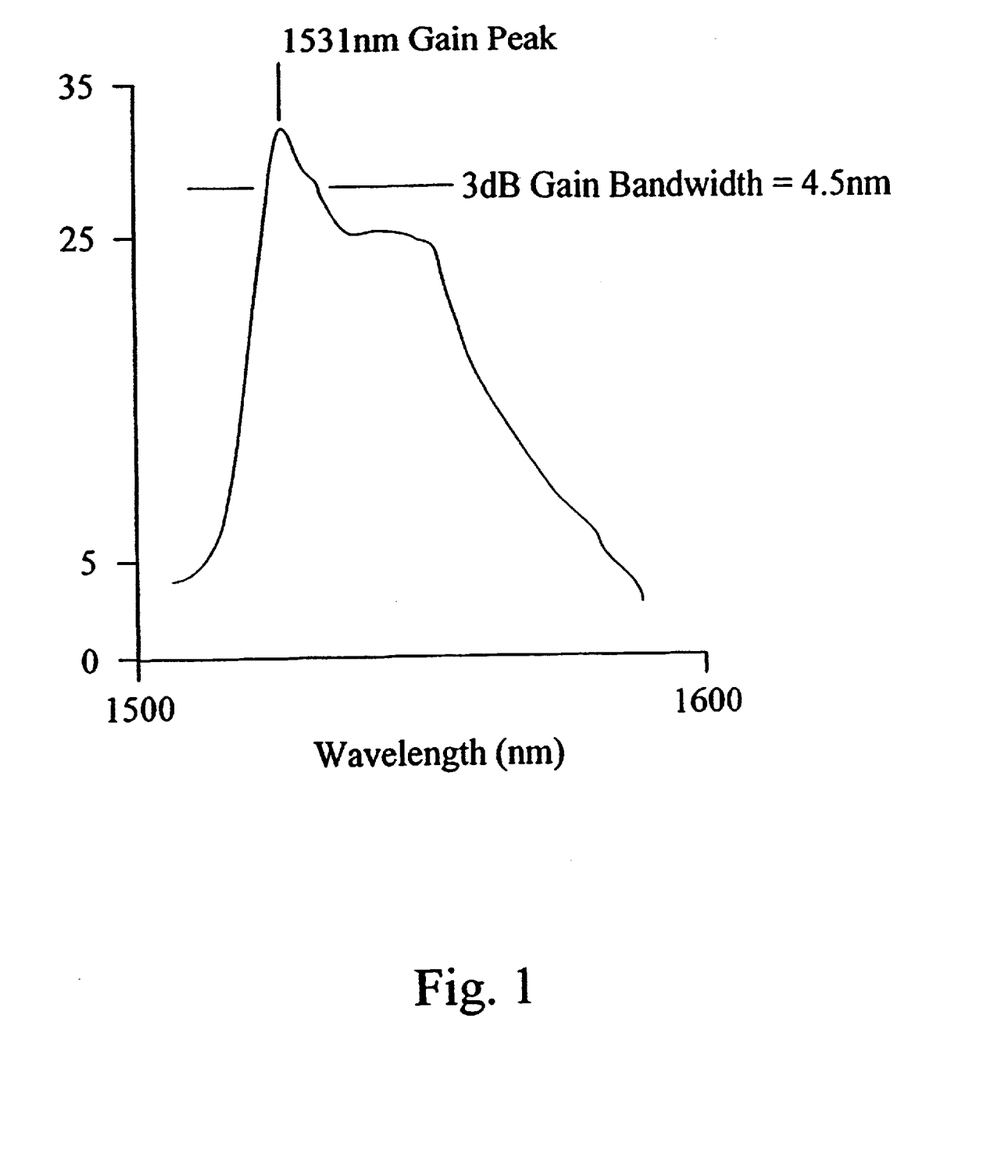
FIG. 1 is a graph of gain (dB) versus wavelength (nm) for a typical erbium doped amplifier.

Notwithstanding these generally excellent characteristics, a disadvantage associated with EDFAs is their narrow spectral width and uneven gain band. The useful telecommunications window of an EDFA is approximately 20–30 nm wide, while an ideal amplifier would have a flat spectral gain across the full spectrum which extends from approximately 1520 nm to 1570 nm. The peak wavelength of the erbium gain spectrum varies from about 1530 nm to about 1535 nm depending upon the host glass material. FIG. 1 shows the characteristic gain spectrum of a particular conventional EDFA where it can be seen that the gain as a function of wavelength varies; this variation will be referred to hereinafter as gain ripple. Numerous techniques have been published for widening and flattening the gain spectrum (i.e. reducing the ripple) and include for example co-doping an erbium-doped silica glass fibre with $Al_2O_3$; changing the host glass material itself; using various forms of attenuating filters to reduce the gain at the emission peak; and, constructing hybrid devices having two or more different types of serially connected erbium doped fibre and actively adjusting pump conditions independently in each fibre section to compensate for the different gain slopes of each fibre.

In addition to the aforementioned problems and solutions associated with minimizing gain ripple, another significant problem exists to which there have been no simple, inexpensive, and practicable solutions. This other significant problem solved by this invention relates to improving dynamic gain tilt. The term dynamic gain tilt as used hereafter means the variation in gain at one wavelength as a result of changing the gain at any other wavelength via a change in input EFA operating conditions. Although the techniques described above for minimizing gain ripple can provide a relatively flat spectrum in a specified wavelength band for a specific set of input optical powers and wavelength, the gain equalization performance degrades rapidly when the gain is changed (change in average population inversion levels) from the nominal conditions by changing the input power to the amplifier. One reported solution to this problem is allegedly achieved by a hybrid fibre device having cascaded amplifying stages with different gain spectra and an equal number of pump sources to allow the gain spectra of the individual stages to be effectively tuned independently so that when the total gain is changed, the relative contribution of each stage can be adjusted to arrive at the desired gain, with a resulting gain spectrum having a minimal amount of spectral distortion over the selected wavelength band. As an example, an erbium doped fibre having a positive gain slope may be combined with a different erbium doped fibre having a negative gain slope such that the hybrid device has a nearly flat gain at specific input power conditions. However, if the overall gain of the hybrid device must be changed, the gain slope of each of the constituent states will generally change at different rates when the pump power input to one of the stages is changed. In order to achieve good compensation at the new operating point, the relative gain of each of the constituent gain stages must be readjusted to make the gain slopes compensate each other. In implementing this type of amplifier, one skilled in the art would likely cascade two or more different erbium doped fibre compositions and provide a separate pump source for each amplifying stage at an end of each stage so as to minimize the number of splices and make it as convenient as possible to independently control the pump power to each stage. However, this technique for reducing or improving dynamic gain tilt requires a complex control scheme during operation in which the total power of multiple pump sources must be coordinated in order to realize gain slope compensation over a range of different gains (i.e. to change input power while maintaining a fixed target output power).

U.S. Pat. No. 5,764,406 in the name of Newhouse et al. entitled Hybrid Optical Amplifier Dynamic Gain Tilt incorporated herein by reference, describes a system wherein an erbium doped fibre amplifier device has a dynamic gain tilt that is less then the gain tilt of any of the constituent fibres. The hybrid device has at most one less pumping source than the number of constituent waveguides of the device. The hybrid device automatically provides a change in the pump distribution among the constituent doped waveguide sections so as to achieve a readjustment of the relative gains of the constituent sections. In one embodiment, this invention provides constituent EDFs of different co-dopant compositions that provides an automatic change in the pump distribution or partitioning among the constituent EDF sections so as to achieve a readjustment of the relative gains of the constituent EDF sections.

Although the '406 patent appears to achieve its intended function, it is a relatively costly and complicated solution to dynamically controlling gain tilt.

Most known solutions for correcting for dynamic gain tilt have an associated power loss (approximately 5dB) and furthermore, increased power is required for extra pumping. Another deleterious result of these systems is an increased resulting noise.

It is an object of this invention to provide a novel filter and method of use of such filter that can be placed in-line within an optical amplifier for varying the gain tilt dynamically as the power of the input signal is varied.

It is another object of the invention to provide an inexpensive filter for use in controlling tilt gain of an optical amplifier.

SUMMARY OF THE INVENTION

In accordance with this invention, there is provided, an optical circuit for gain tilt control of an amplifier and coupled thereto, the optical circuit comprising:

a variable slope optical filter for in-line use with an optical amplifier signal, the filter being disposed upstream, downstream, or within the optical amplifier, the filter having a wavelength response that is sloped within a band of operation wavelengths of the amplifier, the slope of the filter within said band of wavelengths being between zero and a positive or negative number, the filter for passing a band of wavelengths having a centre wavelength λ and having an amplitude response that has an opposite and counter slope as a function of wavelength to that of the amplifier's gain tilt within the operation band of wavelengths, the filter having a port for receiving polarized light;

means for providing a relative polarization difference between two predetermined wavelengths within the band of wavelengths and for controllably varying the polarization difference between the two wavelengths which includes a wavelength dependent element for providing the relative polarization difference between two wavelengths of an incoming beam in a controlled manner; and a polarizer for allowing a predetermined polarization of light to pass therethrough and for substantially preventing and/or attenuating other predetermined polarizations of light to pass therethrough.

In accordance with this invention, there is further provided, a gain tilt optical filter for in-line use with an optical amplifier comprising:

a port for receiving an amplified signal or a signal to be amplified;

means for providing a difference in polarization rotation between two wavelengths within the amplified signal or a signal to be amplified;

a polarizer disposed to receive the amplified signal or a signal to be amplified from the means for rotating; and, means for varying the difference in polarization rotation between the two wavelengths.

In accordance with another aspect of this invention, there is further provided, a method of gain tilt control of an amplified signal or a signal to be amplified comprising the ordered steps of:

a) providing a polarized beam of light comprising a plurality of wavelengths within a band of wavelengths, said band having higher wavelengths and lower wavelengths;

b) controllably varying the polarization of higher or lower wavelengths within the band of wavelengths while providing a difference in the polarization state between the higher and lower wavelengths within the band of wavelengths; and, c) after performing step (b), passing the beam through a polarizer.

BRIEF DESCRIPTION OF THE DRAWINGS

Exemplary embodiments of the invention will now be described in conjunction with the drawings, in which:

FIG. 5a is a block circuit diagram of an alternative embodiment of a gain tilt control circuit that utilizes a fixed multi-order wave plate and a liquid crystal as the polarization control means; and, FIG. 5b is a graph showing the response for the circuit of FIG. 5a.

DETAILED DESCRIPTION

Referring now to FIG. 1 the gain spectrum of a typical EDFA amplifier is shown wherein it can be seen that the gain as a function of wavelength varies.

For a wide variety of glass hosts, rare earth doped optical amplifiers and particularly EDFAs are effectively homogeneously broadened, and the overlap of dopant ions with the signal modes is nearly wavelength independent. As such, the gain spectrum, here being the small signal gain that would be measured by a weak probe signal while the operating point of the amplifier is fixed, is constrained to a single parameter family of wavelength dependencies. Therefore if gain of the amplifier at some reference wavelength is changed due to a change in input, i.e. pump and/or signal power, the amplifier gain at other wavelengths will change by well defined amounts that likely are to be different from the amount of gain change at the reference wavelength. The wavelength dependence of the amplifier gain change as of result of an input change is referred to herein as dynamic gain tilt. Hence, the dynamic gain tilt is a distortion of the amplifier gain spectrum for operating conditions that differ from the operating point for which the amplifier was designed.

As noted in the background of this invention, filters have been provided heretofore for offsetting and flattening the gain spectrum of conventional EDFAs. However providing such a fixed filter does not provide a solution to controlling distortion due to dynamic gain tilt a condition that varies with input power of the input optical signal.

A basic filter in accordance with an embodiment of the invention utilizes wavelength dependent filter in-line with a polarizer coupled to an optical amplifier. The wavelength dependent filter is designed to function differently for higher wavelengths than for lower wavelengths within an operation band of wavelengths of the amplifier. The polarizer which is disposed in-line and downstream from the wavelength dependent filter is a wavelength independent element that allows one polarization through substantially unattenuated and linearly attenuates other polarizations substantially down to zero transmittance.

Figure 2A:
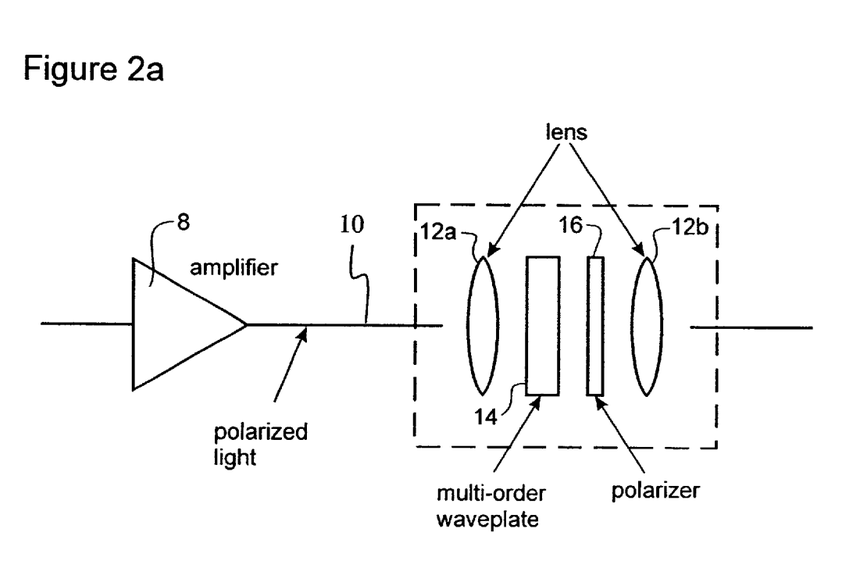
FIG. 2a is a schematic diagram of an optical filter that functions in transmission in accordance with the invention wherein the filter is disposed between a pair of collimating/focusing lenses.
Figure 2B:
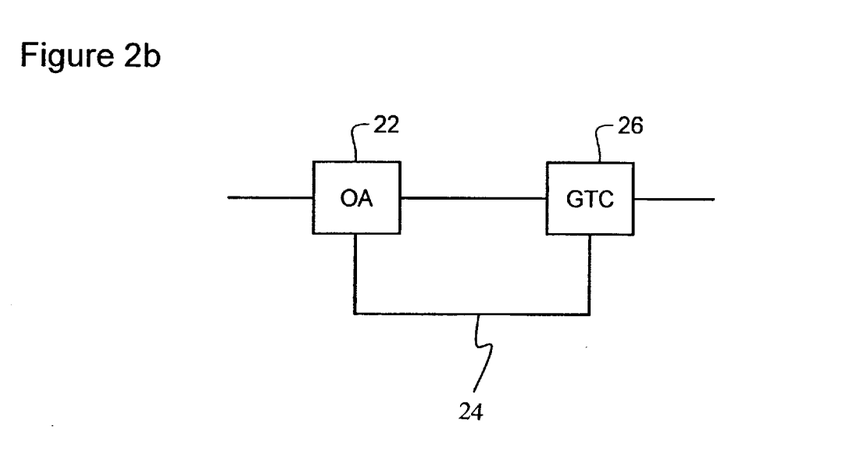
FIG. 2b is a block diagram of an optical amplifying system in accordance with this invention wherein a gain tilt control circuit is coupled with an optical amplifier.

Turning now to FIG. 2a, a detailed arrangement is shown and will be described in accordance with this invention, wherein a wavelength dependent filter 14 in the form of a multi-order wave plate 14 and a wavelength-independent polarization-dependent polarizer 16 are shown sandwiched between collimating/focusing lenses 12a and 12b and optically coupled to an EDFA via polarization maintaining optical fibre 10. The multi-order wave plate is selected to have a thickness that is capable of substantially affecting the polarization of light of wavelength $\lambda 2$ but cannot substantially affect the polarization of light of wavelength $\lambda 1$. For example, a quartz plate with a thickness of about 1.77 mm can be used as the multi-order wave plate, and it forms a half-wave plate at 1580 nm and a full wave plate at 1510 nm. The polarization of light of wavelength $\lambda 2$ can be varied by either rotating the wave plate or can be changed by applying an electric field to the material, for example in the instance where lithium niobate is used as the wave plate.

Thus, the optical axis of the wave plate can be controllably varied through rotation of the crystal or in combination, or alternatively, the birefringence of the material can be controllably varied to achieve a change in retardance.

In operation, gain tilt control can be achieved in the following manner. When a beam of amplified, polarized light having an operational waveband of interest with a lower wavelength of $\lambda 1$ and an upper wavelength of $\lambda 2$ exits a length of polarization maintaining (PM) optical fibre it is coupled from the PM fibre to the lens 12a where it becomes collimated at an output end face thereof, adjacent the multi-order wave plate 14. In this preferred embodiment, a lithium niobate crystal serves as the multi-order wave plate and is selected to have a thickness that will not substantially vary the polarization of light of wavelength $\lambda 1$; however, the crystal is selected to have a thickness that will allow controllable variation of the polarization of light of wavelength $\lambda 2$ passing therethrough; by applying a controlled field to the crystal 14 and/or by physically controllably rotating the crystal about an axis that is coaxial with the optical axes of the lenses the polarization can be controllably varied.

The polarizer 16 is wavelength independent; in order to achieve a gain tilt that will allow the lowest wavelengths to be substantially unattenuated and that will attenuate the higher wavelengths, i.e. $\lambda 2$, the polarizer is oriented such that all of the light of wavelength $\lambda 1$ due to its vertical polarization will pass therethrough. Since this element 16 is wavelength independent, it will also pass any light of wavelength $\lambda 2$ that is vertically polarized, and will pass any vertically polarized components of light of wavelength $\lambda 2$, but will substantially block any horizontal components of light of any wavelength. In this manner, control of gain tilt is achieved by varying the wave plate. For example, when the wave plate is oriented to vary the polarization a field is applied to vary the polarization of light of wavelength $\lambda 2$ by 90 degrees, the polarizer passes all of light of wavelength $\lambda 1$ substantially un-attenuated and does not pass any light of wavelength $\lambda 2$. In the instance where the polarization is only rotated by, for example 45 degrees, half the light of wavelength $\lambda 2$ will be attenuated.

Figures 3A, 3B, 3C:
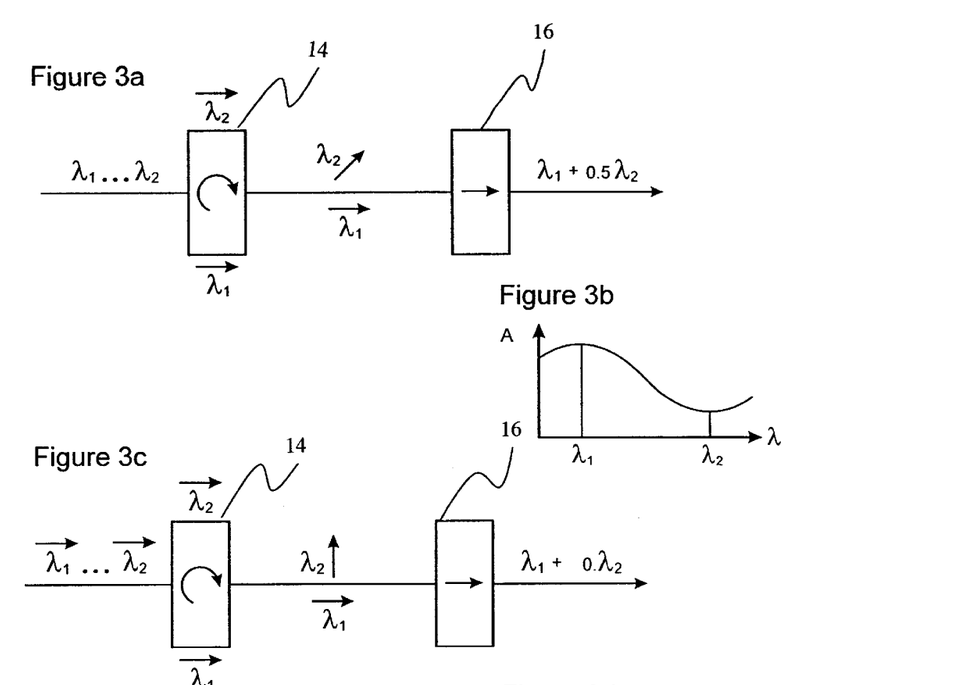
FIGS. 3a, 3c, 3e are a pictorial views of an optical signal received from an amplifier (not shown) received by the variable wave plate and subsequently a polarizer wherein the wave plate is shown to rotate a wavelength λ2 by 45 degrees, 90 degrees and 0 degrees respectively.
FIGS. 3b, 3d, 3f are graphs of wavelength versus amplitude for the circuits shown in FIGS. 3a, 3c and 3e respectively.
Figures 3D, 3E:
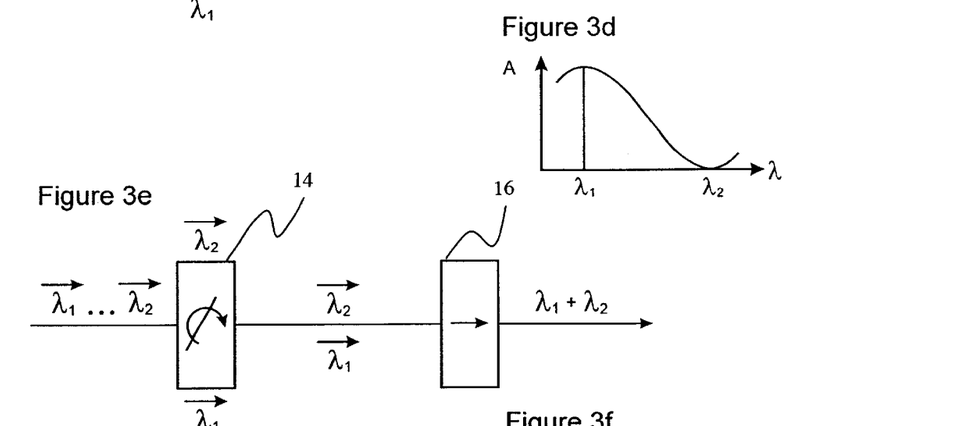
Figure 3F:
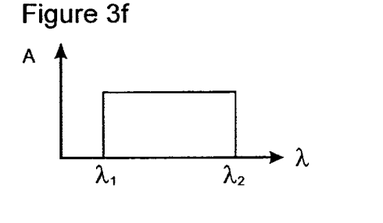

FIGS. 3a through 3c illustrate pictorially the operation of the circuit in accordance with an embodiment of the invention. In FIG. 3a, light received from an amplifier (not shown) is received by the variable wave plate 14. Light of wavelength $\lambda 1$ passes through the wave plate 14 without having its polarization affected. The wave plate is rotated such that that light of wavelength $\lambda 2$ has its polarization rotated by 45 degrees. Thus half of its polarization components are vertical and half are horizontal. The overall effect is that half of the light of wavelength $\lambda 2$ is blocked by the polarizer 16 and half is passed therethrough. Simultaneously all of the light of wavelength $\lambda 1$ is passed through the polarizer. The output response of the entire filter is shown in FIG. 3b. FIGS. 3c through 3f illustrate the operation of the circuit for different amounts of rotation provided by the wave plate 16. In FIG. 3d all of the light of wavelength $\lambda 2$ is attenuated wherein in FIG. 3f no attenuation is provided by the circuit.

Figure 4A:
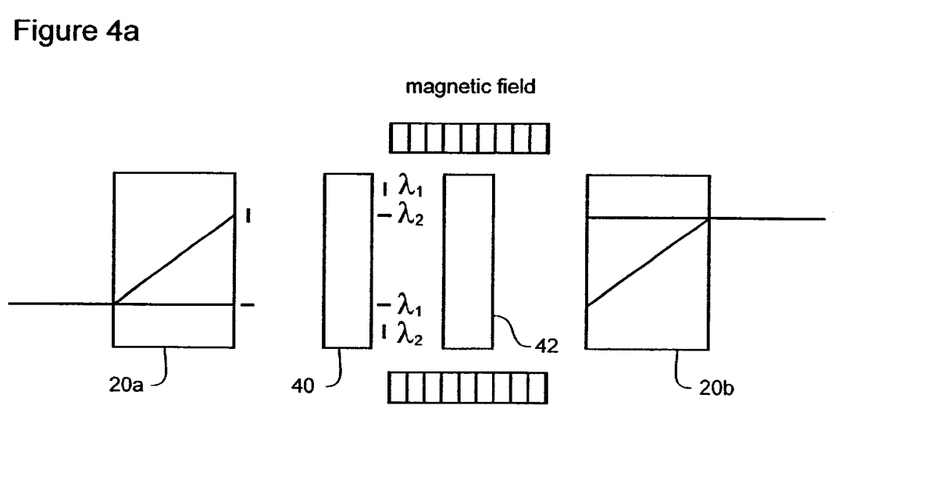
FIG. 4a is a block circuit diagram of an alternative embodiment of a gain tilt control circuit that utilizes a fixed multi-order wave plate and a polarization control means.

The embodiment described heretofore relies upon the input light beam being polarized. However, in an alternative embodiment the light upstream or downstream of the amplifier may not be polarized. The circuit shown in FIG. 4a provides gain tilt control where the state of polarization of light, pre or post amplification is unknown. Although the circuit is preferably disposed after the amplifier, downstream, it can be disposed upstream of the amplifier. In FIG. 4a two polarization beam splitting crystals 20a and 20b are shown at input and output ends of the circuit, coupled to an optical amplifier. Although the circuit is shown downstream of the optical amplifier, it can be disposed upstream of the amplifier. Disposed between the birefringent crystals 20a and 20b is a fixed multi-order wave plate 40 having a thickness that rotates light of wavelength $\lambda 2$ by 90 degrees and which does not affect of the polarization of light of wavelength $\lambda 1$. A polarization control means 42 in the form of a Faraday rotator provides means for controllably rotating the polarization of light passing therethrough in a wavelength independent manner. In the instance where the Faraday rotator 42 induces 45 degrees of rotation, no change in slope is effected, however an unwanted 3 dB of attenuation occurs. However, as is shown in FIG. 4b, as the Faraday rotator applies between zero and 90 degrees of rotation, the slope at the output of the crystal 20b changes in opposite directions, from allowing 100% of input light of wavelength $\lambda 2$ to pass through the crystal 20b while simultaneously attenuating/blocking all of the light of wavelength $\lambda 1$ essentially blocking its transmission through the polarizer in the form of the birefringent crystal, to allowing 100% of input light of wavelength $\lambda 1$ while simultaneously attenuating all of the light of wavelength $\lambda 2$.

To more fully understand the operation of the circuit an input beam transmitted from an amplifier is received by the bireflingent crystal 20a and is separated into two beams having orthogonal polarizations in a wavelength independent manner. Light at one output port of the crystal 20a is vertically polarized and light at the other output port is horizontally polarized. Both beams are input into a multi-order wave plate 40 that is of a thickness that rotates light of wavelength $\lambda 2$ by 90 degrees and which leaves polarization state of light of wavelength $\lambda 1$ substantially unaffected. At the input of the polarization control means light of wavelength $\lambda 1$ is orthogonally polarized to light of wavelength $\lambda 2$. By varying the polarization control means which is a wavelength independent element light of both $\lambda 2$ and $\lambda 1$ is rotated. FIG. 4b illustrates the transmission versus wavelength for different amounts of rotation applied by the Faraday rotator.

Figure 4B:
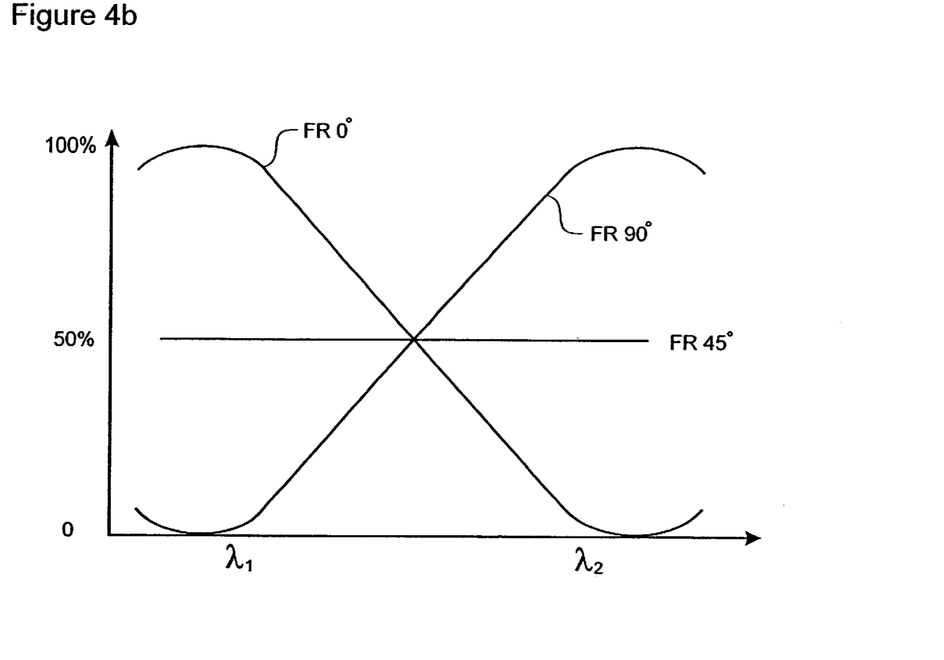
FIG. 4b is a graph of an amplitude versus wavelength response of the circuit shown in FIG. 4a showing 3 different levels of control of the polarization control means.

Although the circuits of FIG. 2a and FIG. 4a are different with respect the former being polarization dependent whereas the circuit of FIG. 4b is polarization independent, both circuits in accordance with this invention provide a tunable slope filter that rely on the use of a means for controllably rotating the polarization of light passing therethrough followed by a polarizing element coupled with an optical amplifier for controlling gain tilt of the amplifier.

Figure 5A:
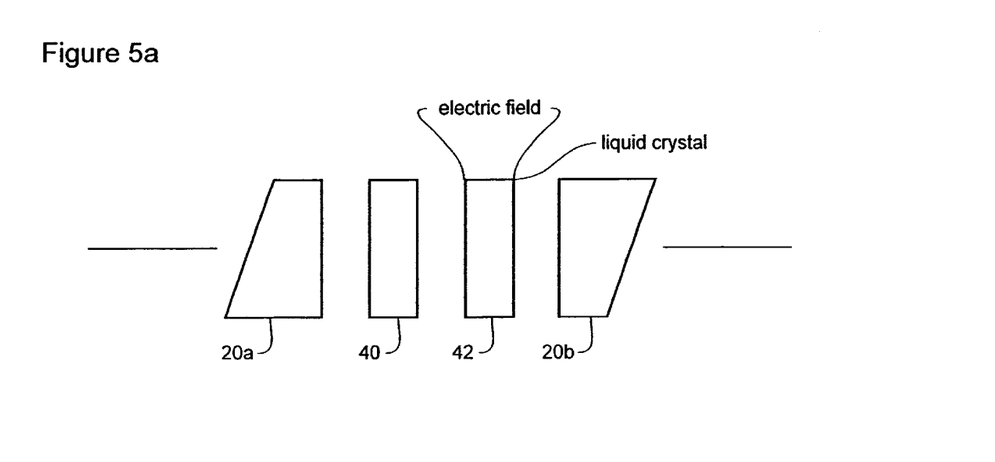
Figure 5B:
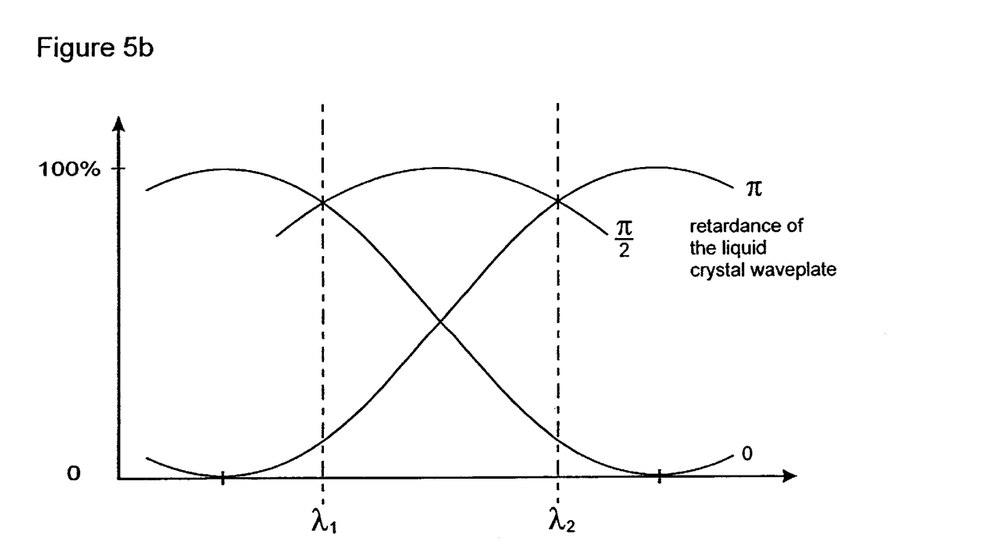

Referring now to FIG. 5a an embodiment of the invention is illustrated wherein a multi-order wave plate 40 and a liquid crystal 42 are disposed in-line and between two birefringent crystals 20a and 20b. FIG. 5b is a graph of the response of the circuit of FIG. 5a. The multi-order wave plate 40 is selected so that it provides a 90 degree polarization rotation at a wavelength λ2+Δλ and a rotation of zero degrees at a wavelength λ1−Δλ; Δλ can be selected according to the linearity requirement for the device.

Of course, numerous other embodiments may be envisaged, without departing from the sprit and scope of the invention. For example, in FIG. 4a instead of a Faraday rotator, a broadband wave plate can be used, and the slope of the device can be varied by either varying the direction of the broadband wave plate or by changing the birefringence of the broadband wave plate so that retardation of the plate is varied. The broadband wave plate can be formed using any birefringent material such as (but not limited to) quartz, rutile, $YVO_3$, $LiNbO_3$, liquid crystal etc.

What I claim is:

1. An optical circuit for gain tilt control of an amplifier and coupled thereto, the optical circuit comprising:
   a variable slope optical filter for in-line use with an optical amplifier signal, the filter being disposed upstream, downstream, or within the optical amplifier, the filter having a wavelength response that is sloped within a band of operation wavelengths of the amplifier, the slope of the filter within said band of wavelengths being between zero and one of a positive and negative number, the filter for passing a band of wavelengths having a centre wavelength λc and having an amplitude response that has an opposite and counter slope as a function of wavelength to that of the amplifier's gain tilt within the operation band of wavelengths, the filter having
   a port for receiving polarized light;
   means for providing a relative polarization difference between two predetermined wavelengths within the band of wavelengths and for controllably varying the polarization difference between the two wavelengths which includes a wavelength dependent element for providing the relative polarization difference between two wavelengths of an incoming beam in a controlled manner; and
   a polarizer for allowing a predetermined polarizations of light to pass therethrough and for substantially preventing and/or attenuating other predetermined polarizations of light to pass therethrough.

2. A filter as defined in claim 1 wherein the means for providing a relative polarization difference between two predetermined wavelengths within the band of wavelengths and for controllably varying the polarization difference between the two wavelengths which includes a wavelength dependent element for providing the relative polarization difference between two wavelengths of an incoming beam in a controlled manner is coupled to the optical amplifier via a feedback circuit, said means for providing the relative polarization difference in response to a feedback signal provided by the feedback circuit.

3. A filter as defined in claim 1, wherein the means for providing a relative polarization difference includes a multi-order wave plate.

4. A filter as defined in claim 3, wherein the multi-order wave plate is a fixed element and is of a thickness that provides a phase difference between the two wavelengths that is greater than a quarter wavelength of one of the two wavelengths.

5. A filter as defined in claim 3, wherein the multi-order wave plate is an element for controllably varying the polarization difference between the two wavelengths within the band.

6. A filter as defined in claim 5, wherein the optical axis of the multi-order wave plate relative to the polarization direction of the incoming beam of light is controllably variable.

7. A filter as defined in claim 5, wherein the retardance of the multi-order wave plate is controllably variable.

8. A filter as defined in claim 4 further comprising a polarization control means for controllably varying the polarization of light passing therethrough within the operation band of wavelengths in a substantially wavelength independent manner.

9. A filter as defined in claim 1 further comprising a first birefringent crystal and a second birefringent crystal at opposite ends of the filter.

10. A gain tilt optical filter for in-line use with an optical amplifier comprising:
    a port for receiving an amplified signal or a signal to be amplified;
    means for providing a difference in polarization rotation between two wavelengths within the amplified signal or a signal to be amplified;
    a polarizer disposed to receive the amplified signal or a signal to be amplified from the means for rotating; and,
    means for varying the difference in polarization rotation between the two wavelengths.

11. A gain tilt optical filter as defined in claim 10 including control means for controlling the polarization of the amplified signal or a signal to be amplified prior to passing said signal to the polarizer.

12. A gain tilt optical filter for use in-line with an optical amplifier as defined in claim 10 further comprising a first polarization beam splitting/combining element for splitting the amplified signal or signal to be amplified into two beams having orthogonal polarization states, said beam splitter optically coupled with the means for rotating the polarization.

13. A gain tilt optical filter as defined in claim 12, wherein the polarizer is a second polarization beam splitting/combining element.

14. A gain tilt optical filter as defined in claim 13, wherein the first and second polarization beam splitting/combining elements are birefringent crystals.

15. A gain tilt optical filter as defined in claim 10, wherein the means providing a difference between two wavelengths within the amplified signal or a signal to be amplified is a multi-order wave plate.

16. A gain tilt optical filter as defined in claim 15 wherein the multi-order wave plate has at least one of a controllable optical axis and a birefringence for controllably varying the polarization of at least a first wavelength of light passing therethrough, while substantially unaffecting the polarization of a second wavelength of light passing therethrough, the first and second wavelengths being at opposite ends of a band of operational wavelengths within the amplified signal or signal to be amplified.

17. A gain tilt optical filter as defined in claim 11 wherein the control means includes a controllable polarization rotating element.

18. A gain tilt optical filter as defined in claim 17 wherein the polarization rotating element is a Faraday rotator.

19. A gain tilt optical filter as defined in claim 17, wherein the polarization rotating element is a wave plate.

20. A method of gain tilt control of an amplified signal or a signal to be amplified comprising the ordered steps of:
    a) providing a polarized beam of light comprising a plurality of wavelengths within a band of wavelengths, said band having higher wavelengths and lower wavelengths;

b) controllably varying the polarization of higher or lower wavelengths within the band of wavelengths while providing a difference in the polarization state between the higher and lower wavelengths within the band of wavelengths; and, c) after performing step (b), passing the beam through a polarizer.

21. A method as defined in claim 20 wherein the polarized beam of light is a portion of an amplified signal to which gain tilt control is to be applied.

22. A method as defined in claim 21 wherein step (b) is performed by passing the polarized beam through an optical element and controllably changing the optical axis or the birefringence of an optical element.

23. A method as defined in claim 20 wherein step (c) effectively attenuates one of:
  i) higher wavelengths within the band to a greater extent than the lower wavelengths within the band, and,
  ii) lower wavelengths within the band to a greater extent than the higher wavelengths within the band.

24. A method as defined in claim 20 wherein the step of controllably varying the polarization of at least a higher wavelengths within the band of wavelengths while substantially unaffecting the polarization of at least a lower wavelength within the band of wavelengths is performed in dependence upon a feedback signal provided from an optical amplifier.

* * * * *